United States Patent [19]
Dolan et al.

[11] Patent Number: 6,030,694
[45] Date of Patent: *Feb. 29, 2000

[54] RIGID SHEET POLYTETRAFLUOROETHYLENE MATERIAL

[75] Inventors: John W. Dolan, Boothwyn, Pa.; David J. Mills, Newark, Del.

[73] Assignee: W. L. Gore & Associates, Inc., Newark, Del.

[ * ] Notice: This patent issued on a continued prosecution application filed under 37 CFR 1.53(d), and is subject to the twenty year patent term provisions of 35 U.S.C. 154(a)(2).

[21] Appl. No.: 08/902,920

[22] Filed: Jul. 30, 1997

Related U.S. Application Data

[63] Continuation of application No. 08/331,835, Oct. 31, 1994, abandoned.

[51] Int. Cl.[7] .............................. B32B 5/18; B32B 5/30; B32B 5/32; B32B 7/02
[52] U.S. Cl. .................. 428/212; 428/66.4; 428/304.4; 428/315.5; 428/315.9; 428/316.6; 428/317.9; 428/319.3; 428/319.7; 428/323; 428/421; 428/422; 277/650; 277/651; 277/652; 277/654; 277/936; 277/945; 277/946
[58] Field of Search ..................................... 277/277, 229, 277/DIG. 6, 231, 232, 233, 650, 651, 652, 654, 936, 945, 946; 428/422, 421, 64.2, 66.4, 304.4, 308.4, 315.5, 317.1, 316.6, 315.9, 319.3, 319.7, 323, 317.9

[56] References Cited

U.S. PATENT DOCUMENTS

| | | | |
|---|---|---|---|
| 3,953,566 | 4/1976 | Gore | 264/288 |
| 4,147,824 | 4/1979 | Dettmann et al. | 428/65 |
| 4,547,424 | 10/1985 | Suzuki | 428/316.6 |
| 4,576,861 | 3/1986 | Kato | 428/316.6 |
| 4,900,629 | 2/1990 | Pitolaj | 428/422 |
| 5,128,209 | 7/1992 | Sakai et al. | 428/421 |
| 5,217,797 | 6/1993 | Knox et al. | 428/246 |
| 5,286,568 | 2/1994 | Bacino et al. | 428/422 |
| 5,431,974 | 7/1995 | Pierce | 428/45 |

FOREIGN PATENT DOCUMENTS

| | | |
|---|---|---|
| 3-89133 | 9/1991 | Japan . |
| 89/11608 | 11/1989 | WIPO . |
| 93/23226 | 11/1993 | WIPO . |

OTHER PUBLICATIONS

Brochure—"Industrial Sealants Gore–Tex GR® Sheet Gasketing," W. L. Gore & Associates, Inc., 1995.
Brochure—"Gore–Tex GR® Sheet Gasketing,", W. L. Gore & Associates, Inc., 1993.
Brochure—"Gore–Tex® Insertable Gaskets," W. L. Gore & Associates, Inc., 1993.
Brochure—"Gore–Tex® Gasket Tape," W.L. Gore & Associates, Inc. 1993.
Brochure—"Sealant Technologies," W. L. Gore & Associates, Inc. (5 Product Sheets), 1989.
PCT International Search Report PCT/US94/14318.

*Primary Examiner*—Vivian Chen
*Attorney, Agent, or Firm*—Allan M. Wheatcraft

[57] ABSTRACT

A composite fluoropolymer material contains outer layers consisting essentially of conformable porous polytetrafluoroethylene (PTFE) and interior layers consisting essentially of rigid fluoropolymer material which may be a densified expanded PTFE, wherein the composite layers may optionally contain electrically conductive fillers. The composite is bonded together to form a sheet material that is sufficiently conformable to provide good seal between surfaces and is sufficiently rigid to make the material easy to handle and install. The material of the present invention is particularly suitable for use as a gasket where rigidity is needed, customization or modification of gasket shape is desirable, and/or where a wide, even sealing surface is sought.

13 Claims, 2 Drawing Sheets

RIGID SHEET POLYTETRAFLUOROETHYLENE MATERIAL

This application is a continuation of application Ser. No. 08/331,835, filed Oct. 31, 1994, abandoned.

BACKGROUND OF THE INVENTION

1. Field of the Invention

The present invention relates to chemically resistant gasket material, and particularly stiffened fluoropolymer gasket materials.

2. Description of Related Art

Expanded polytetrafluoroethylene (PTFE) is widely employed today in a variety of gaskets and other sealing applications. As is disclosed in U.S. Pat. No. 3,953,566 to Gore, this material has numerous properties making it highly desirable as a gasket, including: being readily compressible and conformable; being chemically resistant; having relatively high strength; and being far less prone to creep and loss of sealing pressure than full density PTFE. Gaskets made from PTFE are commercially available from a number of sources, including W. L. Gore & Associates, Inc., Elkton, Md., under the trademark GORE-TEX®, Inertech, Inc., Erlanger, Ky., under the trademark INERTEX® and Garlock, Inc., Palmyra, N.Y. under the trademark GYLON®.

While gaskets formed from pure expanded PTFE perform very well in many gasket applications, these gaskets have a number of deficiencies. One problem with this material is that it is extremely flexible. This flexibility makes the gasket difficult to handle and/or install in many instances, especially where sealing surfaces are in awkward locations or where the gasket may be prone to bending or folding during installation.

A number of solutions have been proposed to address these problems. Some manufacturers have attempted to stiffen the expanded PTFE material by attaching the expanded PTFE to a stiff substrate of metal or similar material. While a metal substrate improves handling characteristics, it tends to constrain possible uses for the gasket, leaving the substrate material subject to attack by harsh chemicals or other environmental factors. One gasket of this type employing a stainless steel core is available from M&P Manufacturing Inc., Freeport, Tex., under the trademark TEPHONIC®.

Garlock Inc. has attempted a similar approach with its ENVELON® gasket. In this instance, the gasket comprises a compressible outer layer containing microballoons surrounding a solid, sintered PTFE material in its middle to prevent media permeation and blowout. This material is apparently disclosed in U.S. Pat. No. 4,900,629 to Pitolaj. However, since the microballons in the ENVELON® gasket are not made of PTFE, the gasket may not be as chemically resistant as may be desirable.

Another approach attempted by some has been to load the expanded PTFE material with a filler that supplies some limited rigidity. Examples of fillers placed into some gasket materials that may supply some limited rigidity include glass microspheres and inorganic microspheres, such as silica and fiberglass. While limited additional rigidity can be supplied in this manner, these fillers tend to diminish the overall performance of the gasket material—limiting chemical or temperature resistance or other qualities.

Still another solution to the problem of insufficient rigidity has been developed by W. L. Gore & Associates, Inc., in its insertable GORE-TEX® gasket product. This gasket comprises a ring gasket constructed entirely from expanded PTFE that has a raised sealing surface and a densified area next to the sealing surface that supplies rigidity to the gasket. As such, the gasket has the advantages of PTFE, such as chemical resistance and good sealing characteristics, while being far easier to install in many applications.

Unfortunately, the structure that provides the improved handling characteristics of the insertable GORE-TEX® gaskets restricts their use in other sealing applications. Insertable gaskets are selectively densified during manufacture to achieve rigidity. As such, these gaskets are not capable of ready modification by the user. Further, unless mounted under high stress, these gaskets do not supply a wide sealing area over the entire gasket face. Conventional expanded PTFE sheet gasketing, however, may be trimmed and modified by the user to address particular sealing needs. Another advantage of these gaskets is that the entire gasket material placed between sealing surfaces serves as a seal.

Accordingly, it is a primary purpose of the present invention to provide a sealing material with the operating advantages of PTFE while being sufficiently rigid so that it can be easily handled and installed.

It is a further purpose of the present invention to provide a rigid PTFE sealing material that has a wide, conformable sealing surface.

It is another purpose of the present invention to provide a rigid PTFE sealing material that can be supplied in a sheet or other form that can be readily customized by a user without compromising gasket integrity.

These and other purposes of the present invention will become evident from review of the following specification.

SUMMARY OF THE INVENTION

The present invention is an improved material suitable for gasketing and other sealing applications. The sealing material of the present invention comprises a composite sheet of flexible conformable polytetrafluoroethylene (PTFE) layers bonded to at least one embedded layer of rigid fluoro polymer, such as densified expanded PTFE material. The composite material is quite rigid while retaining the advantages of conventional expanded PTFE material, such as chemical resistance, strength, ease of sealability and customization, and wide effective sealing areas.

The rigidity of the sealing material of the present invention allows the material to be easily handled and installed without the difficulty associated with excessively flexible gasket products. The use of conformable outer layers provides good sealing properties, permitting the sealing material to fill gaps and imperfections on or between sealing surfaces. The embedded rigid material assures that the sealing material will retain its position during handling, cutting, and mounting without the problems a "floppy" gasket material may encounter. Additionally, the material of the present invention is of a consistent character across its entire sealing surface, allowing the material to be cut or modified into a wide variety of shapes and assuring maximum effective sealing area between sealing surfaces.

DESCRIPTION OF THE DRAWINGS

The operation of the present invention should become apparent from the following description when considered in conjunction with the accompanying drawings, in which.

DETAILED DESCRIPTION OF THE INVENTION

The present invention is an improved stiffened expanded polytetrafluoroethylene (PTFE) material that retains the desirable operative properties of expanded PTFE, while being sufficiently rigid to permit ease in handling and installation. The present invention is particularly suitable for use in gaskets and other sealing applications, and especially those where user modification of the sealing material is desired.

Figure 1:
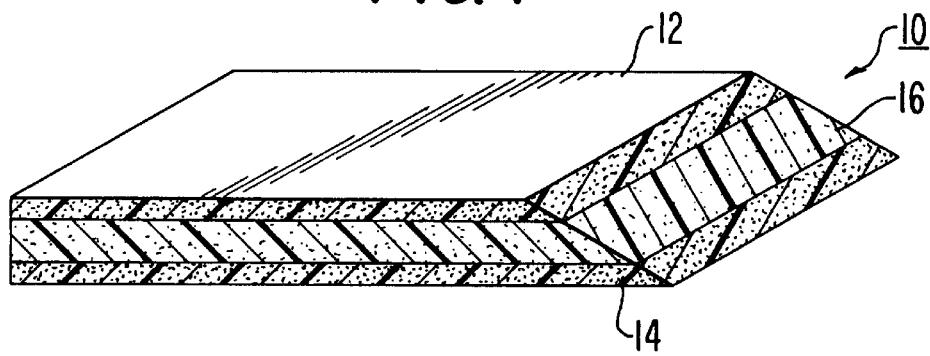
FIG. 1 is a three-quarter isometric view of one embodiment of a composite sealing material of the present invention.

Shown in FIG. 1 is a first embodiment of a rigid PTFE sheet gasket material 10 of the present invention. This sheet material 10 comprises external layers 12, 14 of a porous, expanded PTFE membrane and a core material 16 of a higher rigidity PTFE membrane.

The external layers 12, 14 are constructed from a flexible, conformable material, such as that made in accordance with U.S. Pat. No. 3,953,566 to Gore, incorporated by reference. Preferably, these layers are chemically inert and are conformable to sealing surfaces. Particularly preferred is an expanded PTFE material such as that commercially available from W. L. Gore & Associates, Inc., under the trademark GORE-TEX GR® sheet gasket. This material comprises a flexible sheet having a thickness ranging from 0.0254 to 25 mm, a void volume of 40 to 85%, a longitudinal tensile strength of about 22 to 38 MPa and a transverse tensile strength of about 11 to 22 MPa. This material is soft to touch and will readily conform to imperfections in sealing surfaces.

Layer 12, 14 may be attached to the core material 16 in any suitable manner including by using an adhesive material, through melting, or other bonding method. Suitable adhesives for use with the present invention include an ePTFE saturated with an adhesive polymer, such a fluorinated ethylene propylene (FEP), perfluoroalkoxy polymer (PFA) or other film, liquid, powder or rigid structure that may be used to establish a bond. Alternatively or additionally, an effective bond may be formed by melting the two layers 12, 14 into core 16. This may be accomplished by raising the temperature to or near the melt temperature of the fluoropolymer (e.g., about 327 to 382° C. for PTFE) and applying sufficient pressure to adhere the surfaces together, (e.g., pressures of 20 to 6000 kPa).

The rigidity of the present invention is supplied by core 16. This material should be sufficiently stiff that the gasket will not "flop" when held on edge. Moreover, unlike previous attempts to embed a stiffener material such as some metal, the core 16 comprises a fluoropolymer material that has the same chemical properties as the external layers 12, 14. Preferably, the core material 16 is an expanded PTFE layer that has a higher rigidity than the outer layers 12, 14. Most preferably, the core 16 for a 1.59 mm thick type sheet gasket, is formed from a densified expanded PTFE made in the following manner:

(a) layering one or more sheets of porous expanded PTFE film on a plate that can withstand temperatures exceeding 380° C. and pressure up to 1.72 MPa (250 psi). Preferably, 80 to 120 layers of such material are employed, each layer comprising a thickness of 0.038 mm prior to treatment;

(b) laying a second plate over the top of the film layers;

(c) placing the two plates containing the expanded PTFE sheets inside a bag made of polyimide film or other flexible film stable for several hours at temperatures as high as 380° C.;

(d) fitting the bag with a hose connection and placing the assembly in an autoclave;

(e) drawing a vacuum inside the bag and gradually raising the temperature and pressure inside the autoclave over a period of time until reaching the sintering temperature of the expanded PTFE and a pressure between 1.0 and 2.4 MPa (150–350 psi), and preferably between 1.4 and 1.7 MPa (200–250 psi);

(f) after a suitable time between about 10 minutes and 4 hours, cooling the autoclave while gradually reducing the pressure;

(g) removing the bag from the autoclave, and removing the densified expanded PTFE sheet from the bag and plates.

Once core 16 is formed, each of the external layers 12, 14 are positioned around the core 16 and the structure is then laminated together into the gasket material 10 of the present invention. Preferably, the gasket 10 for a 1.59 mm thick type sheet gasket, is formed in the following manner:

(1) The following materials are stacked on a stainless steel autoclave caul plate in this order:

0.15 to 0.36 mm GORE-TEX GR® sheet gasketing 1.0 to 1.3 mm fully densified ePTFE made in accordance with the above description;

0.15 to 0.36 mm GORE-TEX GR® sheet gasketing.

All caul plates should be treated with mold release, such as RELEASE-ALL 50 mold release from Air Tech International Inc., to prevent sticking.

(2) A second stainless steel autoclave caul plate, equal in dimensions to the first, is placed on top of the materials.

(3) The above combination of materials and caul plates are placed onto a vacuum-ready, stainless steel, autoclave carrier plate. The materials are positioned so that they are against the vacuum tube of the carrier plate.

(4) The top caul plate is covered with a piece of polyimide film equal in length and width to the caul plates to prevent the adhesion of the breather cloth described below to the caul plate. This minimizes the cleaning and ease of removal of the caul plate after a process cycle.

(5) The polyimide film is covered with a piece of fiberglass breather cloth. The breather cloth should be of a suitable porosity so as to permit the flow of air during the autoclave cycle. The cloth should also withstand a temperature of 370° C. for approximately 4 hours. The size of the breather cloth should be such that it drapes over the materials beneath it, the carrier plate vacuum tube, and onto the carrier plate. Ultra high temperature (UHT) fiberglass breather cloth from Air Tech International, Inc. may be utilized in this process.

(6) The form-in-place sealant is placed along all edges of the breather cloth. The ends of the sealant are overlapped.

(7) The breather cloth and sealant are covered with a continuous piece of polyimide film. The film should cover all of the breather cloth and sealant. It should exceed all edges of the sealant by approximately 25 mm. This will assure an appropriate seal between the polyimide film and the caul plate.

(8) Additional quantities of sealant are inserted at the sealant corners (i.e., the corners of the package) to ensure a seal is maintained between the polyimide film bag and the caul platen.

(9) The polyimide film is secured to the sealant by pressing the film onto the sealant by hand. A successful package will allow air to travel in and out of the package through the vacuum line only.

(10) A vacuum line which draws a vacuum over the carrier plate is connected to a test vacuum pump for a period of ten minutes which permits sufficient time to lower the pressure approximately 760 mm (30 in) Hg within the polyimide bag. An impregnation vacuum pump, such as that manufactured by BUEHLER Inc., may be used. The vacuum in the bagged system may be monitored using a vacuum gauge such as that manufactured by Marshal having ±6.9 kPa precision. After 10 minutes, the test vacuum pump pressure is separated from the carrier plate by closing a valve between the vacuum gauge and the vacuum pump. A test period of two minutes is used to determine whether or not a sufficient seal is created within the polyimide bagged system and the carrier caul plate. A sufficient seal is indicated by no movement in the vacuum gauge after the completion of the two minute test period.

(11) After determining that there is no apparent vacuum leaks within the bagged system, a high temperature adhesive backed polyimide tape is applied to the edges of the polyimide covering. The corners were taped thoroughly so that the film is not pulled away from the sealant in the autoclave.

(12) The test vacuum pump, vacuum gauge, and vacuum line assembly are disconnected from the carrier plate.

(13) The carrier plate and its contents are placed into the autoclave. A carrier plate vacuum line is connected to a vacuum port in the pressure chamber of the autoclave and the autoclave door is secured.

(14) The vacuum line is removed from the vacuum pump outside of the pressure chamber to open the package to the outside atmosphere.

(15) A preprogrammed autoclave cycle is run with the following parameters, concurrently:

| Temperature: | 370° C. |
| --- | --- |
| | Ramp - 15 minutes |
| | Soak - 45 minutes |
| Pressure: | 34.5 kPa (5 psi) |
| | Ramp - Immediate |
| | Soak - 60 minutes |

(16) When the run is complete, the autoclave is opened, the carrier plate vacuum line is disconnected from the autoclave vacuum port, and the carrier plate is removed immediately, hence no set cool-down period is maintained before removing the caul platen to ambient temperature.

(17) All polyimide film and breather cloth are removed from the carrier plate. The top caul plate is removed from the material. The material is immediately removed from the carrier plate and placed between two ambient temperature caul plates (equal to or greater than its length and width) to promote quick cooling.

(18) The material is removed from the caul plates after 10 minutes.

(19) All used polyimide film, tape, breather cloth, and sealant are discarded.

A densified expanded PTFE material, when laminated into a gasket of the present invention, imparts the desired rigidity without compromising any of the chemical resistance or other desirable properties of expanded PTFE gaskets.

It should be appreciated that skived PTFE may be used in place of the fully densified expanded PTFE in the present invention. This material is commercially available and may be prepared in the following manner:

Granular PTFE is molded into a solid cylindrical billet under heat and pressure. (Typically, a temperature of about 330° C. and a pressure of about 34.5 MPa (5000 psi)). Vacuum is generally applied to the billet during molding to assure absence of air pockets. Once cooled, the billet is then rotated about its axis and the desired thickness of material is skived or cut from the outer surface into a continuous sheet. Optionally, the billet may be annealed to reduce internal stresses and then rotated. The total width of the sheet is dependent upon the billet height. The desired length of material is cut from the continuous sheet produced.

Figure 2:
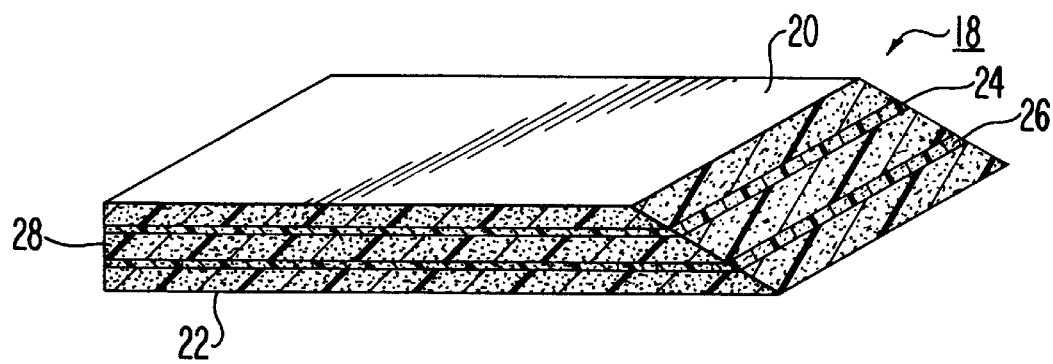
FIG. 2 is a three-quarter isometric view of a second embodiment of a composite sealing material of the present invention.

A further embodiment of the present invention is shown in FIG. 2. In this embodiment, the gasket sheet material 18 comprises: outer layers 20, 22 of conformable PTFE material; rigid inner layers 24, 26 of rigid PTFE material attached to each of outer layers 20, 22, respectively; and a center layer 28 of conformable PTFE attached between each of the rigid inner PTFE material layers 24, 26. Although the properties of each of the layers may be modified to satisfy specific performance characteristics to the sheet 18, for most applications the conformable layers 20, 22, and 28 should comprise a flexible expanded PTFE material, such as that previously described. In the embodiment shown, outer layers 20, 22 are approximately 0.006" (0.15 mm) wide, and center layer 28 is approximately 0.034" (0.86 mm) wide.

Similarly, the rigid inner layers 24, 26 comprise a densified expanded PTFE material, such as the core 16 previously described. Since two layers are provided, each of these layers may be significantly reduced in thickness. As shown, each of the rigid layers is approximately 0.010" (0.25 mm) thick.

This embodiment may be constructed in the same manner previously described, only employing the following stock of material:

0.1–0.2 mm GORE-TEX GR® sheet gasketing
0.2–0.3 mm Fully densified ePTFE
0.8–1.0 mm GORE-TEX GR® sheet gasketing
0.2–0.3 mm Fully densified ePTFE
0.1–0.2 mm GORE-TEX GR® sheet gasketing It should be evident from the above description that the gasket of the present invention may take a number of forms while retaining the advantages of the present invention. By mounting conformable, expanded PTFE sheets as the external surfaces of the gasket, the gasket of the present invention retains all of the conforming and sealing properties of presently available expanded PTFE sheet gasketing. By then mounting one or more layers of a stiffened expanded PTFE material in the core, the desired stiffness can be imparted without compromising the sealability or chemical compatibility of the basic fluoropolymer. Since the final gasket material may continue to be provided in the form of a sheet, the gasket of the present invention may be easily modified by the end user for particular applications, and the gasket continues to have a flat, wide effective sealing surface.

Figure 4:
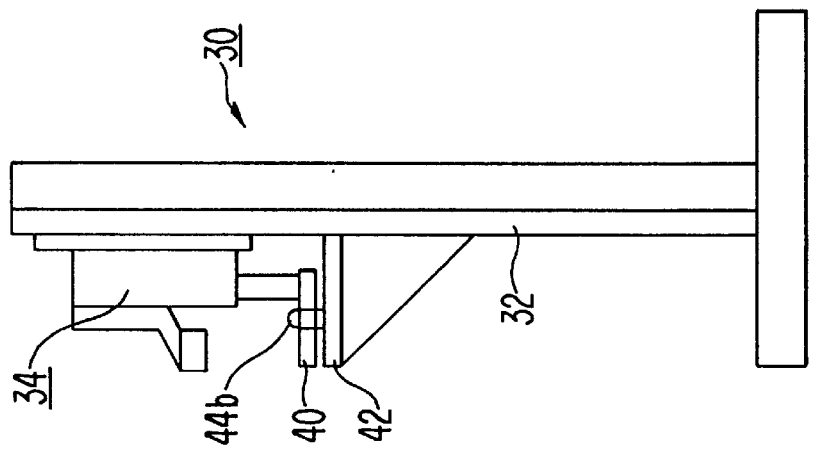
FIG. 4 is a side elevation view of the test rig of FIG. 3.
Figure 3:
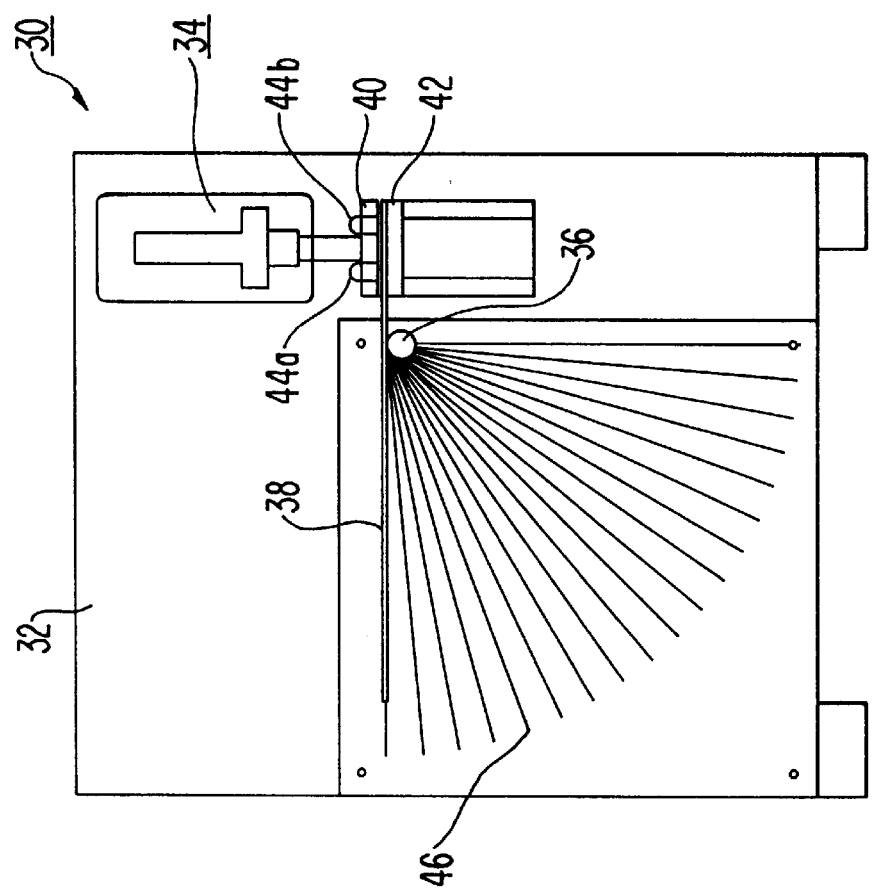
FIG. 3 is a front elevation view of a test rig used to measure the rigidity of the composite sealing of the present invention.

In order to quantify the degree of improved rigidity of the sheet material formed in accordance with the present invention, a test apparatus 30 has been developed as shown in FIGS. 3 and 4. This apparatus 30 comprises an up-right backboard 32 having a clamp mechanism 34 and a pivot bar 36 attached thereto. A test sample 38 of material to be tested is prepared in the manner described below and is mounted in the clamp mechanism 34, forming a tight constraint between clamp head 40 and landing 42. One or more studs 44a, 44b may be provided on the landing to assure exact orientation and secure restraint of the test sample 38.

In operation, each test sample 38 is mounted in this apparatus 30 in the manner shown, with the test sample extending outwardly from the clamp mechanism 34 over pivot bar 36. Over time, the test sample 38 will distort downwardly around the pivot bar 36 due to the effect of gravity on the outwardly extending portion of the test sample 38. This effect may be accelerated by placing a clip or other weight on the end of the sample 38. The weight of the clip used in the testing was 12.5 grams.

The amount of rigidity of the test sample may then be recorded as the degree of deflection downward over a given period of time. In the embodiment of the test apparatus 30 shown, the backboard 32 includes a series of hatched marks 46 thereon to allow for easy determination of the degree of down ward deflection (i.e., extending from 0° (i.e., no movement) to 90° (i.e., a complete distortion straight down from the pivot bar 36)).

Figure 5:
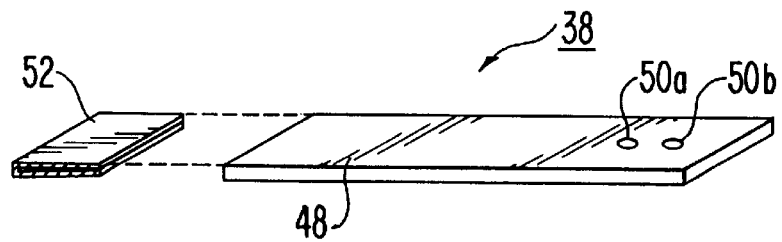
FIG. 5 is a three-quarter isometric view of a test sample of gasket material of the present invention suitable for testing on the test apparatus of FIG. 3.

It is important that each piece of material to be tested by this apparatus be prepared in a consistent manner. Shown in FIG. 5 is one suitable construction for the test sample 38. In this form, the test sample 38 comprises a strip of material 48 cut to approximately 266.70 mm in length and 38.10 mm in width. Openings 50a, 50b are provided to interface with studs 44a, 44b. In order to accelerate the downward distortion of the test sample, a weighted clip 52 (e.g., one made from steel, lead, or similar materials) is provided to removably attach to the end of each sample to be tested.

Test Results:

Comparative tests were performed on the material of the present invention made in accordance with the construction of FIGS. 1 and 2 above, as well as conventional gasket materials of GORE-TEX GR® sheet gasketing acquired from W. L. Gore & Associates, Inc., Elkton, Md., and GYLON 3504 acquired from Garlock Inc. The tests performed included creep relaxation (ASTM F-38B), sealability (ASTM F-37), compressibility/recovery (ASTM F-36), and rigidity (employing the test apparatus described above). The results are summarized in the following table.

test fixture utilized consisted of a 6.35 mm (¼") diameter penetrator pin, dial indicator, load transfer assembly, air cylinder, and pressure regulator. The penetrator pin is connected to the load transfer assembly and its movement measured by the dial indicator. Load is applied pneumatically and is controlled by an air regulator. The test method was performed in the following manner:
1. Acquire or cut a test specimen approximately 12.70 mm (½") diameter.
2. Measure and record the test specimen thickness.
3. Zero the dial indicator.
4. Center the test specimen beneath the penetrator pin. Using the air regulator pre-load the material to 0.69 MPa (100 psi) for 15 seconds. Measure and record the pre-load thickness after 15 seconds.
5. Apply the major load of 17.25 MPa (2500 psi) for 1 minute. Measure and record the major load thickness after 1 minute.
6. Remove the major load but leave the test specimen in the fixture.
7. Wait 1 minute and record the recovery thickness.
8. Remove test specimen from test fixture. Discard test specimen.
9. Compressibility is calculated by the following equation:

$$\frac{\text{pre-load thickness} - \text{major load thickness}}{\text{pre-load thickness}} \times 100$$

10. Recovery is calculated by the following equation:

$$\frac{\text{recovery thickness} - \text{major load thickness}}{\text{pre-load thickness} - \text{major load thickness}} \times 100$$

Test Method for Sealability

ASTM F-37 is a standard test method for testing the sealability of gasketing materials. The test method was performed in the following manner:
1. Cut a 39.69 mm (1%16") I.D.×58.74 mm (2⅚16") O.D. (1471.06 mm² (2.28 in²)) test specimen. ASTM docu-

| MATERIAL | THICKNESS MM (IN) | CREEP RELAXZATION (%) 23° C. | CREEP RELAXZATION (%) 100° C. | SEALABILITY 32/500 Microinch MPa (PSI) | COMP/REC (%) | RIGIDITY (DEGREES) UNWTD | RIGIDITY (DEGREES) WTD | OPERATING TEMPERATURE LIMTATIONS (° C.) |
|---|---|---|---|---|---|---|---|---|
| GORE-TEX ® GR SHEET GASKETING | 1.9 (.073) | 36.5 | 61.8 | 22.4/34.5 (3250/5000) | (62.7/12.1) | 44.0 | 75.0 | 315° C. |
| RIGID SHEET (FIG. 1) OF PRESENT INVENTION | 1.4 (.055) | 19.1 | 55.0 | 21.9/23.4 (3175/3400) | (27.1/28.0) | 16.0 | 43.0 | 315° C. |
| RIGID SHEET (FIG. 2) OF PRESENT INVENTION | 1.8 (.070) | 34.1 | 75.7 | 19.5/32.2 (2833/4666) | (24.9/31.8) | 4.0 | 14.2 | 315° |
| GYLON ® 3504 | 1.6 (.062) | 33.8 | 65.3 | 17.6/30.3 (2550/4400) | (35.0/30.0) | 2.0 | 12.7 | 260 |

The specific test parameters for each of these tests are set forth below:

Test Method for Compressibility and Recovery

ASTM F-36 is a standard test method for measuring the compressibility and recovery of gasketing materials. The mentation requires a 31.75 mm (1¼") I.D.×44.45 mm (1¾") O.D. (722.62 mm² (1.12 in²)) test specimen.
2. Measure and record the thickness of the test specimen.
3. Center the test specimen between two 152.40 mm×152.40 mm×25.4 mm (6"×6"×1") steel test platens with surface finishes ranging from 32–500 microinch (0.8–12.7 micrometers). One platen must be blind and the other machined to allow for pressurization. Record surface finish.
4. Connect a pressurization device to a manometer and the test platens.
5. Place the platens into a pressurization fixture.
6. Apply an external force until the stress on the gasket is equal to 3.5 MPa (500 psi).
7. Pressurize (internally) the test platens to 0.21 MPa (30 psi) with ambient air.
8. Isolate one side of the manometer by closing the isolation check valve on the manometer. (One side of the manometer will monitor the constant applied pressure of the pressurization device and the other pressure decay if present.)
9. Note any change in the manometer level. A change in the manometer level is an indication of a leak or lack of seal.
10. If no change is noted after ½ hour, the material under pressure is considered sealed. Measure and record the external load on the test platens. If the level of the manometer has changed increase the gasket stress load by 0.69–3.50 MPa (100–500 psi). Incremental loading is determined by operator experience. After ½ hour note any change in manometer level.
11. Continue until an effective seal is established. Record the external load responsible for the seal.
12. Remove the internal pressure from the test platens. Remove the external load from the system. Remove test specimen from the fixture. Discard test specimen or save for further documentation.

Test Method for Compressive Creep Relaxation

ASTM F-38 is a standard test method for testing the compressive creep relaxation of gasketing materials. The test method was performed in the following manner:
1. Cut a 33.34 mm (1 5/16") I.D.×50.80 mm (2") O.D. (1129.10 mm² (1.75 in²)) test specimen. ASTM documentation requires the test specimen to have a surface area of approximately 1290.40 mm² (2.0 in²).
2. Center the test specimen between two 12.70 mm (½") I.D.×76.20 mm (3") O.D.×25.4 mm (1") thick steel test platens with 16–32 microinch (0.4–0.8 micrometers) surface finishes.
3. Complete the fixture assembly with a UNF grade 3/8"–24 calibrated bolt approximately 76.2 mm (3") long with a floating pin center, washer, and nut. The floating pin is affixed only to the bolt head and permitted to float down the inside shaft of the bolt. Place the bolt through the inside diameters of the test platens. Place the washer and nut on the end of the bolt.
4. Tighten the nut on to the bolt finger tight. Stop when the nut and washer are restrained against the test platen.
5. Restrain the head of the bolt. Place a 9/16" wrench about the nut and attach a dial indicator to the end of the bolt. Spin the indicator clock-wise onto the bolt until finger tight.
6. Determine desired gasket stress. (20.7 MPa (3000 psi))
7. Determine the respective load (2,386 kg ((5,250 lb.)) required to develop the desired gasket stress.
8. Consult the bolt calibration load vs. elongation chart for the necessary bolt elongation required to impart the necessary load. Record the required bolt elongation or initial deflection.
9. Set the dial indicator to match the initial bolt elongation or deflection.
10. Rotate the nut clockwise using the wrench until the dial indicator reaches zero. This load or bolt elongation should be imparted within a 15 second period of time.
11. Remove the dial indicator and the wrench.
12. Place the fixture in an elevated temperature environment if desired.
13. The test runs for approximately 24 hours. If tested at an elevated temperature remove the fixture from the high temperature environment after 22 hours. Allow to cool for 2 hours.
14. Restrain the head of the bolt as done before. Place a 9/16" wrench about the nut and attach the dial indicator to the end of the bolt as done before.
15. Set the indicator to zero.
16. Rotate the nut counter-clockwise using the wrench until the indicator dial stops moving.
17. Record dial indicator reading. This is the final or remaining bolt elongation.
18. Disassemble the test fixture and discard the test specimen.
19. Compressive creep relaxation is calculated by the following equation:

$$\frac{\text{Initial Deflection} - \text{Final Deflection}}{\text{Initial Deflection}} \times 100$$

Test Method for Rigidity

Rigidity was measured by placing a standard die cut sample (FIG. 5) of the material into the test fixture (FIGS. 3 & 4), clamping it into place horizontally, and allowing it to remain cantilevered 190.5 mm (7½") under its own weight for 1½ minutes. The test fixture is graduated in five degree intervals with a total range of 90 degrees. After 1½ minutes of cantilevering record the materials deflection in degrees. Each test sample is then loaded at its free end with a 12.5 gram clip (FIG. 5) and retested in the same manner. Test samples are 38.10 mm (1½") wide×266.70 mm (10½") long with two 9.53 mm (3/8") locating holes 12.70 mm (½") and 38.10 mm (1½") from one end.

The material of the present invention provides sufficient rigidity that it can be easily handled and installed. Since rigidity is provided by embedded densified expanded PTFE material, a composite sheet of the present invention may be readily cut into virtually any desired shape without particularly compromising the sealability or rigidity of the material. For most compositions, the material of the present invention may be cut using a blade, die, or other suitable means.

Additionally, unlike previous PTFE gaskets that achieved rigidity through selective densification of certain surface areas of the gasket face (i.e., diminishing the sealability of those areas), the material of the present invention provides an even sealing area across its entire face. This assures more reliable and consistent contact between sealing surfaces while, again, permitting far greater freedom in gasket modification.

Finally, since the material of the present invention comprises PTFE throughout, it does not have the limitations found with previous materials. Accordingly, the material can withstand operating temperatures up to 315° C. (600° F.). Other stiffened gasket materials, such as BLUE GYLON® Style 3504 gasketing and ENVELON® Style 3565 gasketing contains additives that limit its effective operating temperature range (e.g., to the neighborhood of 260° C. (500° F.)).

EXAMPLE I

A three part construction of the present invention was produced in the following manner:

(1) The following materials were stacked on a 1.6 mm thick by 406 mm wide by 660 mm long stainless steel autoclave caul plate in this order:

0.51 mm thick (cut to the area of 406 mm wide by 660 mm long using conventional shears) GORE-TEX GR® sheet gasketing Model #GR0.05 available from W. L. Gore and Associates, Elkton, Md.

3.18 mm thick (cut to the area of 406 mm wide by 660 mm long using conventional shears) conventional full density skived PTFE available from McArdle Desco Corporation, New Castle, Del.

0.51 mm thick (cut to the area of 406 mm wide by 660 mm long using conventional shears) GORE-TEX GR® sheet gasketing Model #GR0.05 available from W. L. Gore and Associates, Elkton, Md.

All caul plates are of similar dimensions and all were treated with RELEASE-ALL 50 mold releasing agent available from Air Tech International Inc., to prevent sticking.

(2) A second stainless steel autoclave caul plate was placed on top of the materials keeping the same width and length orientation as the other caul plate and materials.

(3) The above combination of materials and caul plates were then placed onto a vacuum ready, stainless steel, autoclave carrier plate. The materials were positioned so that they were against the vacuum tube of the carrier plate.

(4) The top caul plate was covered with a piece of 0.051 mm thick polyimide film (KAPTON available from E. I. Du Pont de Nemours Company, Wilmington, Del.) equal in length and width to the caul plates.

(5) The polyimide film was covered with a piece of an ultra high temperature (UHT) fiberglass breather cloth from Air Tech International, Inc. The breather cloth was of a suitable porosity so as to permit the flow of air during the autoclave cycle. The breather cloth was cut to a size such that it draped over the materials beneath it, including the carrier plate vacuum tube, and a 10 to 20 mm portion around the perimeter of the base caul plate laying on the carrier plate.

(6) A silicone form-in-place autoclavable sealant was placed along all edges of the breather cloth in a continuous fashion. The ends of the sealant were overlapped to create a closed loop of sealant in the plane of the carrier plate.

(7) The breather cloth and sealant were covered with a piece of polyimide film. Care was taken so that the polyimide film covered all of the breather cloth and sealant and that the polyimide film exceeded all edges of the sealant by approximately 25 mm. This was done to assure there exists sufficient slack film material so that a seal between the polyimide film and the caul plate could be maintained during the autoclave cycle.

(8) Additional quantities of sealant were inserted at the sealant corners (i.e., the corners of the package) to ensure a seal between the polyimide film bag and the caul platen.

(9) The polyimide film is secured to the sealant by pressing the film onto the sealant by hand. A successful package will allow air to travel in and out of the package through the vacuum line only.

(10) A vacuum line which draws a vacuum over the carrier plate is connected to a test vacuum pump for a period of ten minutes which permits sufficient time to lower the pressure approximately 760 mm (30 in) Hg within the polyimide bag. An impregnation vacuum pump, such as that manufactured by BUEHLER Inc., may be used. The vacuum in the bagged system may be monitored using a vacuum gauge such as that manufactured by Marshal having ±6.9 kPa precision. After 10 minutes, the test vacuum pump pressure is separated from the carrier plate by closing a valve between the vacuum gauge and the vacuum pump. A test period of two minutes is used to determine whether or not a sufficient seal is created within the polyimide bagged system and the carrier caul plate. A sufficient seal is indicated by no movement in the vacuum gauge after the completion of the two minute test period.

(11) After determining that there is no apparent vacuum leaks within the bagged system, a high temperature adhesive backed polyimide tape is applied to the edges of the polyimide covering. The corners were taped thoroughly so that the film is not pulled away from the sealant in the autoclave.

(12) The test vacuum pump, vacuum gauge, and vacuum line assembly are disconnected from the carrier plate.

(13) The carrier plate and its contents were carefully placed into the autoclave. A 6.35 mm inside diameter vacuum line was connected to the carrier plate and to a vacuum port in the pressure chamber of the autoclave and the autoclave door was closed and secured.

(14) The vacuum line leading from the port within the vacuum chamber is permitted to vent to atmospheric pressure (i.e., the inside of the polyimide bagged system was vented at atmospheric pressure.

(15) The autoclave cycle was programmed to run at the following parameters for inside the vessel's chamber concurrently:

| | |
|---|---|
| Temperature: | 370° C. |
| | Ramp - 15 minutes |
| | Soak - 45 minutes |
| Pressure: | 34.5 kPa (5 psi) |
| | Ramp - Immediate |
| | Soak - 60 minutes |

(16) The autoclave was opened after completion of the autoclave cycle. The carrier plate vacuum line was disconnected from the autoclave vacuum port, and the carrier plate was removed immediately, hence no set cool-down period was maintained before removing the caul platen to ambient temperature.

(17) All polyimide film and breather cloth were removed from the carrier plate. The top caul plate was removed from the material. The material was then immediately removed from the carrier plate and placed between two caul plates (equal to or greater than its length and width) at ambient temperature thus facilitating a fast cool-down period.

(18) The material was removed from the caul plates after 10 minutes.

(19) All used polyimide film, tape, breather cloth, and sealant were discarded.

The resulting structure was a three layered bicomponent sheet material which had soft or conformable outer surfaces but yet rigid to flexure thus making it very useful as a gasketing material. It is especially useful for cut gaskets having thin cross-sectional areas since it is advantageous to the gasket user, that the gasket not flex during gasket placement. The present invention provides a gasketing material which is both conformable and rigid to flexure.

EXAMPLE II

A five part construction of the present invention was produced using the method of manufacture as outlined in EXAMPLE I, the following materials were stacked on a 1.6 mm thick by 406 mm wide by 660 mm long stainless steel autoclave caul plate in this order:

0.2 mm thick (cut to the area of 406 mm wide by 660 mm long using conventional shears) GORE-TEX GR® sheet gasketing Model #GR0.02 available from W. L. Gore and Associates, Elkton, Md.

0.25 mm thick (406 mm wide by 660 mm long) fully densified expanded PTFE as described below 0.88 mm thick (cut to the area of 406 mm wide by 660 mm long using conventional shears) GORE-TEX GR® sheet gasketing Model #GR32 available from W. L. Gore and Associates, Elkton, Md.

0.25 mm thick (406 mm wide by 660 mm long) fully densified expanded PTFE as described below 0.2 mm thick (cut to the area of 406 mm wide by 660 mm long using conventional shears) GORE-TEX GR® sheet gasketing Model #GR0.02 available from W. L. Gore and Associates, Elkton, Md.

The 0.25 mm thick, fully densified expanded PTFE was produced using the following method:

A section measuring 406 mm wide by 660 mm long was cut using conventional shears from a 1219 mm wide by 1422 mm long sheet of 1 mm thick GORE-TEX GR® sheet gasketing Model #GR32 available from W. L. Gore and Associates, Elkton, Md.

The cut section was placed on a 1.6 mm thick by 406 mm wide by 660 mm long stainless steel platen called a caul platen. A second stainless steel caul platen similar in dimensions was placed on top of the cut section maintaining the length and width orientation of all sections. Both caul plates were treated with RELEASE-ALL 50 mold releasing agent available from Air Tech International Inc., to prevent sticking.

The caul platen- GORE-TEX GR® sheet gasketing-caul platen assembly was then placed on a carrier plate for an autoclave. A vacuum bag made of 0.051 mm thick KAPTON polyimide film available for E. I. Du Pont de Nemours Company, Wilmington, Del., was made such that a vacuum can be drawn through the carrier plate and thus over the caul platen-GORE-TEX GR® sheet gasketing-caul platen assembly. To aid in the removal of entrapped air within the gasket material and also minimize the chance of the caul platen from piercing the polyimide vacuum bag during the autoclave cycle, a piece of an ultra high temperature (UHT) fiberglass breather cloth from Air Tech International, Inc., was cut to a size such that it draped over the caul platen assembly. The cut size was such that, when draped over the assembly, the breather cloth covered the carrier plate vacuum tube, and a 10 to 20 mm portion around the perimeter of the base caul plate laying on the carrier plate.

The polyimide film was cut oversized such to cover the caul platen assembly by approximately 20–35 mm around the perimeter of the assembly. A silicone autoclavable caulk or sealant was placed along the edges of the breather cloth in a continuous fashion having the ends of the silicone sealant or caulk overlapped to create a closed loop of the sealant in the plane of the carrier plate.

The polyimide film was then carefully pressed down along its perimeter on to the silicone caulk by the hand. The four comers were gathered by the natural folding of the polyimide film and additional silicone caulk was placed inside the edges of the folds and pressed together by hand pressure as well, thus creating a closed structure.

The vacuum bagged assembly laying on the carrier plate was placed into an autoclave. A vacuum was drawn to at least 630 mm of Hg inside the polyimide caul platen assembly thus subjecting the GORE-TEX GR® sheet gasketing to the vacuum.

The assembly then was subjected to the following temperature and pressure (concurrent) operation:

| Temperature: | Ramp 1 - at ambient Temperature - 10 minutes |
| --- | --- |
| | Ramp 2 from ambient to |
| | Temperature = 370° C. - 40 minutes |
| | Soak - 60 minutes |
| | Ramp Down - 30 minutes |
| Pressure: | 1.8 MPa |
| | Ramp - 50 minutes |
| | Soak - 60 minutes |
| | Ramp Down - 30 minutes |
| Total duration = 140 minutes | |

After the autoclave operation, the carrier plate was removed from the autoclaved and permitted to cool to ambient temperature before disassembling. The resulting structure between the caul platens was a 0.25 mm thick, full density expanded PTFE sheet good. This process was run twice such to produce two 0.25 mm thick (406 mm wide by 660 mm long) fully densified expanded PTFE sheets. These two sheets were used as sheets number 2 and 4 in the five layer stack lay-up of this example.

Following the manufacturing steps in accordance to EXAMPLE I, the five layer-structure was produced which is suitable for an improved gasket material. The rigidity to flexure was enhanced over the three-layer construction of EXAMPLE I. The five layer sheet has improved stiffness over the three layer construction sheet due to the placement of the higher Modulus of Elasticity (full density material) at an optimal distance from the neutral bending axis and reducing weight by minimizing the weight ratio of full density material to low density material.

EXAMPLE III

An alternative construction of the present invention can be produced in the following manner: The core material consisting of skived full density PTFE in EXAMPLE I can be replaced by fluorinated ethylene propylene (FEP), or perfluoroalkoxy polymer (PFA) or other film material possessing a stiffer modulus of elasticity or flexural modulus than low density expanded PTFE.

By replacing the full density PTFE/ePTFE with equivalent thicknesses of FEP or PFA materials in accordance to EXAMPLE I, the resulting sheet gasket will be conformable on the outer surfaces and maintain a stiffness which renders the sheet material favorable to be used as a gasket material. Demonstrating equivalent rigidity to those materials produced with full density PTFE/ePTFE in EXAMPLES I and II, the overall chemical and thermal resistance of this material will be less due to the lower chemical and thermal properties inherent to FEP and PFA.

Example IV

Below is a contemplated example of a rigid but conformable organically and or inorganically filled fluoropolymeric gasketing material which is suitable in applications requiring improved electromagnetic interference (EMI) characteristics.

Electronic devices and housings of electronic components requiring seals typically can not use standard seals or gaskets. Typical (common) seal material such as rubber, paper or fluoropolymer seals do not conduct electromagnetic energies very effectively. Problems or malfunctioning of the electronics may result due to extraneous electrical waves, or energy if typical (common) sealing materials are used in these electronic applications.

A method to correct this EMI deficiency of common sealing medium is to provide a sealing gasket material which is electrically conductive.

The gasket of the present invention can be altered such to make it useful as a gasket for EMI applications. This improved rigid but conformable gasketing material can be produced using a graphite filled (or other electrically conductive materials such as aluminum or gold etc.) expanded PTFE material and coupling it with a graphite filled densified expanded PTFE in the manner as disclosed in EXAMPLE I. Similar to the construction in EXAMPLE 1 except that the raw expanded PTFE materials are loaded with an electrically conductive material as taught in U.S. Pat. No. 5,286,568 to Bacino and the thinner outer conformable filled ePTFE materials as taught in U.S. Pat. No. 4,985,296 to William P. Mortimer, Jr., each incorporated by reference. The electrically loaded materials can be added up to 60% by weight into the expanded PTFE matrix thus providing or tending to a matrix with isotropic and enhanced electrical properties.

Moreover, the densified ePTFE filled material need not be filled to the same loading of the electrically conductive material as the low density filled expanded PTFE (i.e., the uncompressed ePTFE) since at full density, the electrically conductive particles are in very close proximity and contact with one another thereby decreasing the electrical resistance thus increasing the electrical conductivity of the material matrix. Hence, the electrical conductivity of the full density material will be higher than the electrical conductivity of the compressible low density material at to same electrical conductive particle loading. The electrical conductivity of the two materials will be similar when the gasket material of the present invention is subjected to pressures greater than 17.25 MPa (2500 psi) rendering the entire gasket to full density. If in the sealing application, a gasket clamping force of 17.25 MPa (2500 psi) or greater is not necessary to reach a seal such as for low pressure liquid medium, then the electrically conductive particle loading of the low density-conformable ePTFE must be proportionally higher or greater than the loading of the rigid loaded-densified ePTFE material to achieve similar electrical conductivity between the two materials.

While particular embodiments of the present invention have been illustrated and described herein, the present invention should not be limited to such illustrations and descriptions. It should be apparent that changes and modifications may be incorporated and embodied as part of the present invention within the scope of the following claims.

The invention claimed is:

1. A composite fluoropolymer material suitable for sealing between surfaces that comprises:
   at least two external layers consisting essentially of conformable porous polytetrafluoroethylene;
   at least one layer consisting essentially of rigid fluoropolymer material, the rigid fluoropolymer material layer being laminated between the conformable porous polytetrafluoroethylene layers to form the composite material;
   wherein the composite material is sufficiently rigid to have an unweighted downward deflection of 16 degrees or less.

2. The composite fluoropolymer material of claim 1 wherein the rigid fluoropolymer material is a rigid polytetrafluoroethylene material.

3. The composite fluoropolymer material of claim 2 wherein the rigid polytetrafluoroethylene material is a densified expanded polytetrafluoroethylene.

4. The composite fluoropolymer material of claim 1 wherein
   the rigid fluoropolymer material is a densified expanded polytetrafluoroethylene; and
   the conformable porous polytetrafluoroethylene is expanded polytetrafluoroethylene.

5. The composite fluoropolymer material of claim 1 which comprises
   at least two layers consisting essentially of rigid fluoropolymer material; and
   at least three layers consisting essentially of conformable porous polytetrafluoroethylene;
   wherein each layer of rigid fluoropolymer material is lamninated between two of said conformable porous polytetrafluoroethylene layers.

6. The composite fluoropolymer material of claim 1 wherein the material comprises a sheet that can be cut into various shapes of rigid gaskets.

7. The composite fluoropolymer material of claim 6 wherein the gaskets are constructed entirely from polytetrafluoroethylene and are chemically resistant.

8. A composite fluoropolymer material suitable for sealing between surfaces that comprises
   at least two external layers consisting essentially of conformable porous polytetrafluoroethylene and a filler of electrically conductive material; and
   at least one layer consisting essentially of rigid fluoropolymer material and a filler of electrically conductive material, the rigid fluoropolymer material layer being laminated between the conformable porous polytetrafluoroethylene layers to form the composite material,
   wherein the composite is sufficiently rigid to have an unweighted downward deflection of 16 degrees or less and will conduct electromagnetic interference energy.

9. A composite material suitable for sealing between surfaces that comprises:
   at least two layers consisting essentially of conformable expanded polytetrafluoroethylene;
   at least one layer consisting essentially of densified expanded polytetrafluoroethylene, the densified expanded polytetrafluoroethylene layer being laminated between the conformable expanded polytetrafluoroethylene layers to form the composite material;
   wherein the composite material is sufficiently rigid to handled and installed between sealing surfaces and is chemically resistant.

10. The composite material of claim 9 which comprises
    at least two layers of densified expanded polytetrafluoroethylene; and
    at least three layers of conformable expanded polytetrafluoroethylene;
    wherein each densified expanded polytetrafluoroethylene layer is laminated between two of said conformable expanded polytetrafluoroethylene layers.

11. The composite material of claim 9 wherein the material comprises a sheet that can be cut into various shapes of rigid gaskets.

12. A composite fluoropolymer material suitable for sealing between surfaces that comprises:
    at least three layers consisting essentially of conformable expanded polytetrafluoroethylene; and
    at least two layers consisting essentially of rigid fluoropolymer material, the rigid fluoropolymer material layers being laminated between the conformable expanded polytetrafluoroethylene layers to form the composite material;

wherein the composite material is sufficiently rigid to have an unweighted downward deflection of 16 degrees or less.

13. A composite fluoropolymer material suitable for sealing between surfaces that comprises:

at least three layers consisting essentially of conformable expanded polytetrafluoroethylene and a filler of electrically conductive material; and at least two layers consisting essentially of densified expanded polytetrafluoroethylene and a filler of electrically conductive material, the densified expanded polytetrafluoroethylene layers being bonded between the conformable expanded polytetrafluoroethylene layers to form the composite material;

wherein the composite material is sufficiently rigid to be handled and installed between sealing surfaces and is sufficiently conformable by way of its external layers to provide an effective seal between the surfaces, and wherein the composite will conduct electromagnetic interference energy.

* * * * *